(12) United States Patent
Hu et al.

(10) Patent No.: US 10,179,701 B2
(45) Date of Patent: Jan. 15, 2019

(54) TRANSPORTATION SUPPORT ASSEMBLY AND TRANSPORT DEVICE

(71) Applicant: BOE TECHNOLOGY GROUP CO., LTD., Beijing (CN)

(72) Inventors: Nannan Hu, Beijing (CN); Lei Cao, Beijing (CN); Zifeng Wang, Beijing (CN); Yan Ren, Beijing (CN); She Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/736,246

(22) PCT Filed: Apr. 20, 2017

(86) PCT No.: PCT/CN2017/081226
§ 371 (c)(1),
(2) Date: Dec. 13, 2017

(87) PCT Pub. No.: WO2017/186052
PCT Pub. Date: Nov. 2, 2017

(65) Prior Publication Data
US 2018/0194557 A1    Jul. 12, 2018

(30) Foreign Application Priority Data

Apr. 28, 2016 (CN) .......................... 2016 1 0278492

(51) Int. Cl.
*B62B 1/14* (2006.01)
*B65G 7/04* (2006.01)
(Continued)

(52) U.S. Cl.
CPC .................. *B65G 7/04* (2013.01); *B62B 1/14* (2013.01); *B62B 1/26* (2013.01); *B62B 5/0083* (2013.01);
(Continued)

(58) Field of Classification Search
CPC .. B62B 1/14; B62B 1/26; B62B 1/268; B62B 3/108; B62B 5/0083; B62B 5/0085;
(Continued)

(56) References Cited

U.S. PATENT DOCUMENTS 1,717,358 A * 6/1929 Adcock ................. B62B 5/0083
280/35
1,788,150 A * 1/1931 Curtin ................... B62B 5/0083
190/18 A
(Continued)

FOREIGN PATENT DOCUMENTS

CN         2161344 Y    4/1994
CN       202096691 U    1/2012
(Continued)

OTHER PUBLICATIONS

First Chinese Office Action, for Chinese Patent Application No. 201610278492.X, dated Aug. 22, 2017, 13 pages.
(Continued)

*Primary Examiner* — Emma K Frick
(74) *Attorney, Agent, or Firm* — Kinney & Lange, P.A.

(57) ABSTRACT

A transportation support assembly and a transport device are provided in embodiments of the disclosure, the transportation support assembly comprising: a supporting plate; a first baffle plate; a second baffle plate; and at least one bundling strap. Each of the first baffle plate and the second baffle plate is hinged with the supporting plate and is provided thereon respectively with at least one through-hole through which the at least one bundling strap passes such that the first baffle plate, the second baffle plate and the bundling strap cooperate with one another to clamp an object to be supported. Thereby, human labor as required for handling and carrying
(Continued)

an apparatus is saved, and any risk in handling and carrying of the apparatus is also reduced, by the transportation support assembly.

11 Claims, 4 Drawing Sheets

(51) Int. Cl.
*B62B 5/00* (2006.01)
*B62B 1/26* (2006.01)

(52) U.S. Cl.
CPC ........ *B62B 5/0086* (2013.01); *B62B 2202/30* (2013.01); *B62B 2202/56* (2013.01); *B65G 2201/0223* (2013.01)

(58) Field of Classification Search
CPC .............. B62B 2202/56; B62B 5/0086; B65G 2201/0223; B65G 7/04
See application file for complete search history.

(56) References Cited

U.S. PATENT DOCUMENTS

| | | | | |
|---|---|---|---|---|
| 2,229,244 A * | 1/1941 | Husted | .................. | B62B 5/0083 280/79.11 |
| 2,359,016 A * | 9/1944 | Wood | .................. | B62B 5/0083 16/34 |
| 2,375,338 A * | 5/1945 | Alexander | ........... | A45C 13/385 190/18 A |
| 3,717,357 A * | 2/1973 | Schaefer | ............... | B62B 5/0083 280/35 |
| 4,108,451 A | 8/1978 | Scheck, Sr. | | |
| 5,465,987 A * | 11/1995 | DellaVecchia | ............ | B62B 1/12 280/47.18 |
| 6,880,836 B2 * | 4/2005 | Kawensky | ............ | B62B 5/0083 280/35 |
| 9,126,611 B2 * | 9/2015 | Liu | .......................... | B62B 5/067 |
| 9,937,944 B2 * | 4/2018 | Anderson | ............. | B62B 5/0086 |
| 2006/0182566 A1* | 8/2006 | Russo | ....................... | B62B 1/14 414/444 |
| 2007/0102893 A1* | 5/2007 | Mayo | ........................ | B62B 3/10 280/79.11 |
| 2008/0235871 A1* | 10/2008 | York | ....................... | B62B 3/108 5/510 |
| 2014/0116809 A1 | 5/2014 | Chen et al. | | |

FOREIGN PATENT DOCUMENTS

| | | |
|---|---|---|
| CN | 102689763 A | 9/2012 |
| CN | 103183194 A | 7/2013 |
| CN | 103693442 A | 4/2014 |
| CN | 204161738 U | 2/2015 |
| CN | 105216838 A | 1/2016 |
| CN | 105270845 A | 1/2016 |
| CN | 105730969 A | 7/2016 |
| CN | 205555228 U | 9/2016 |
| DE | 9304586 U1 | 5/1993 |
| JP | 2006001384 A | 1/2006 |

OTHER PUBLICATIONS

Chinese Rejection Decision, for Chinese Patent Application No. 201610278492.X, dated Nov. 6, 2017, 10 pages.
International Search Report & Box V of Written Opinion, for PCT Patent Application No. PCT/CN2017/081226, dated Jun. 30, 2017, 9 pages.

* cited by examiner

TRANSPORTATION SUPPORT ASSEMBLY AND TRANSPORT DEVICE

CROSS-REFERENCE TO RELATED APPLICATION

The present application is the national phase of PCT Application No. PCT/CN2017/081226 filed on Apr. 20, 2017, which in turn claims the benefit of Chinese Patent Application Invention No. 201610278492.X filed on Apr. 28, 2016 in the State Intellectual Property Office of China, the whole disclosure of which is incorporated herein by reference.

BACKGROUND

Field of the Disclosure

Embodiments of the present disclosure relate to the technical field of transportation, and in particular, to a transportation support assembly and a transport device.

Description of the Related Art

Nowadays, dimensions of a television set become larger and larger, bringing totally new experience to users while also bringing about inconvenience to users during handling thereof due to even larger weight thereof. Especially as to some commercial large-size television set, for example, a television set of 110 inch with a weight of nearly 200 kilograms, it may be hard to move manually without any specialized tool; and since the television set is a fragile product, even larger difficulties in handling thereof are hereby brought about.

In addition, in a manufacturing process of the large-size television set, a plurality of tests are required to be implemented thereon, during which the television set is required to be moved. Generally, it is also an extremely difficult operation to handle and/or carry the television set onto a carrier or a trolley; and the carrier/trolley may occupy a relatively large space during daily storage thereof.

SUMMARY

The embodiments of the present disclosure have been made to overcome or alleviate at least one aspect of the above mentioned disadvantages and/or shortcomings in the prior art, by providing a transportation support assembly and a transport device, so as to reduce human labor as required for handling and carrying an apparatus, and to decrease any risk in handling and carrying of the apparatus.

Following technical solutions are adopted in exemplary embodiments of the invention for achieving the above desired technical purposes.

According to an aspect of the exemplary embodiment of the present disclosure, there is provided a transportation support assembly, comprising: a supporting plate; a first baffle plate; a second baffle plate; and at least one bundling strap; and each of the first baffle plate and the second baffle plate is hinged with the supporting plate and is provided thereon respectively with at least one through-hole through which the at least one bundling strap passes such that the first baffle plate, the second baffle plate and the bundling strap cooperate with one another to clamp an object to be supported.

According to an embodiment of the disclosure, an articulation axis which is provided at a position where the first baffle plate and the supporting plate are hinged with each other is parallel to an articulation axis at a position where the second baffle plate and the supporting plate are hinged with each other.

According to an embodiment of the disclosure, the first baffle plate is provided with a first through-hole, while the second baffle plate is provided with a third through-hole and a fourth through-hole, and the at least one bundling strap comprises two bundling straps which pass through the first through-hole of the first baffle plate collectively and then pass through the third through-hole and the fourth through-hole of the second baffle plate respectively.

According to an embodiment of the disclosure, the first baffle plate is provided with a first through-hole and a second through-hole, while the second baffle plate is provided with a third through-hole and a fourth through-hole, and the at least one bundling strap comprises two bundling straps, one of the two bundling straps passing through the first through-hole of the first baffle plate and the third through-hole of the second baffle plate while the other one of the two bundling straps passing through the second through-hole of the first baffle plate and the fourth through-hole of the second baffle plate, without any intersection being provided between the two bundling straps.

According to an embodiment of the disclosure, the supporting plate comprises two sliding chutes provided on two opposite side end surfaces thereof in one-to-one correspondence, respectively, and the second baffle plate further comprises a pair of rollers which snap fit into the two sliding chutes in one-to-one correspondence respectively, the pair of rollers being assembled slidably within and pivotable relative to the two sliding chutes respectively.

According to an embodiment of the disclosure, the supporting plate further comprises a mounting recess on a front end surface thereof perpendicular to the two opposite side end surfaces, in which mounting recess the first baffle plate is mounted in a hinged manner.

According to an embodiment of the disclosure, the first baffle is profiled to be substantially in a form of L shape, and is provided with a limiting portion which is pivotable to a lower portion of a bottom wall of the supporting plate.

According to an embodiment of the disclosure, at least one of the first baffle plate and the second baffle plate further comprises a cushion mat on a side thereof against which side the object to be supported is clamped.

According to an embodiment of the disclosure, each bundling strap comprises a buckle and a strap, one end of the strap being secured to the buckle, while the other one end of the strap being configured to pass through the buckle and to adjust a level of tension of the bundling strap.

According to an embodiment of the disclosure, the transportation support assembly further comprising at least one omni-directional rolling wheel which is assembled at a bottom portion of the supporting plate.

According to an embodiment of the disclosure, in case that a first included angle is formed between two opposite surfaces of the object to be supported which surfaces are clamped by the first baffle plate and the second baffle plate respectively, the first articulation axis between the first baffle plate and the supporting plate and the second articulation axis between the second baffle plate and the supporting plate also form a second included angle therebetween which is equal to the first included angle.

According to an embodiment of the disclosure, in case that the first baffle plate and the second baffle plate press closely against the object to be supported respectively, the two bundling straps, which pass through the first through-hole of the first baffle plate collectively and then pass through the third through-hole and the fourth through-hole of the second baffle plate respectively, are in tension so as to form a steady triangular structure collectively with the second baffle plate.

According to an embodiment of the disclosure, the sliding chutes are formed respectively into the two opposite side end surfaces, in a lengthwise direction of the supporting plate at an end thereof abutting the second baffle plate.

According to an embodiment of the disclosure, the mounting recess is formed on the front end surface perpendicular to the two opposite side end surfaces, in a lengthwise direction of the supporting plate at an end thereof abutting the first baffle plate.

According to another aspect of the exemplary embodiment of the present disclosure, there is provided a transport device for transporting an apparatus provided with a plurality of objects to be supported, comprising a plurality of the transportation support assemblies as above, wherein the objects to be supported are fixed onto the transportation support assembly respectively such that the apparatus is movable wholly by the transport device.

According to an embodiment of the disclosure, the apparatus comprises a television set, and the objects to be supported comprise supporting legs supporting the television set.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF PREFERRED EMBODIMENTS

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the transportation support assembly and the transport device.

According to a general technical concept of the present disclosure, there is provided a transportation support assembly, comprising: a supporting plate; a first baffle plate; a second baffle plate; and at least one bundling strap. Each of the first baffle plate and the second baffle plate is hinged with the supporting plate and is provided thereon respectively with at least one through-hole through which the at least one bundling strap passes respectively such that the first baffle plate, the second baffle plate and the bundling strap cooperate with one another to clamp an object to be supported. Thereby, human labor as required for handling and carrying an apparatus is saved, and any risk in handling and carrying of the apparatus is also reduced.

Figure 1:
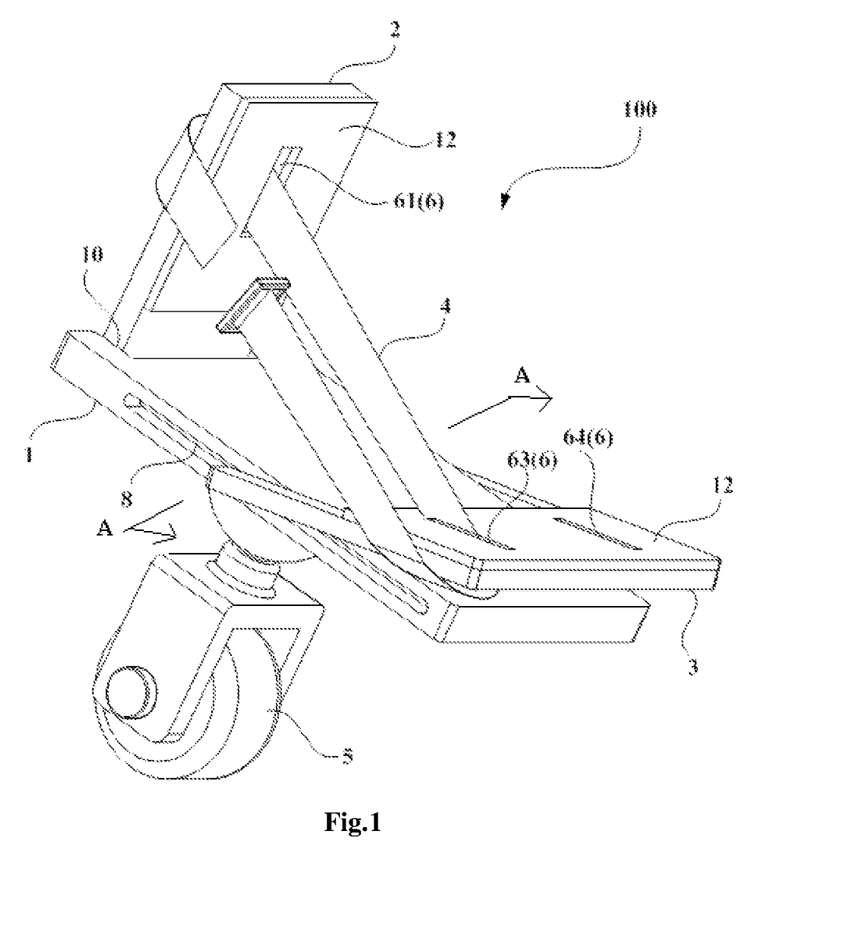
FIG. 1 illustrates a schematic perspective view of a transportation support assembly according to an embodiment of the disclosure.
Figure 2:
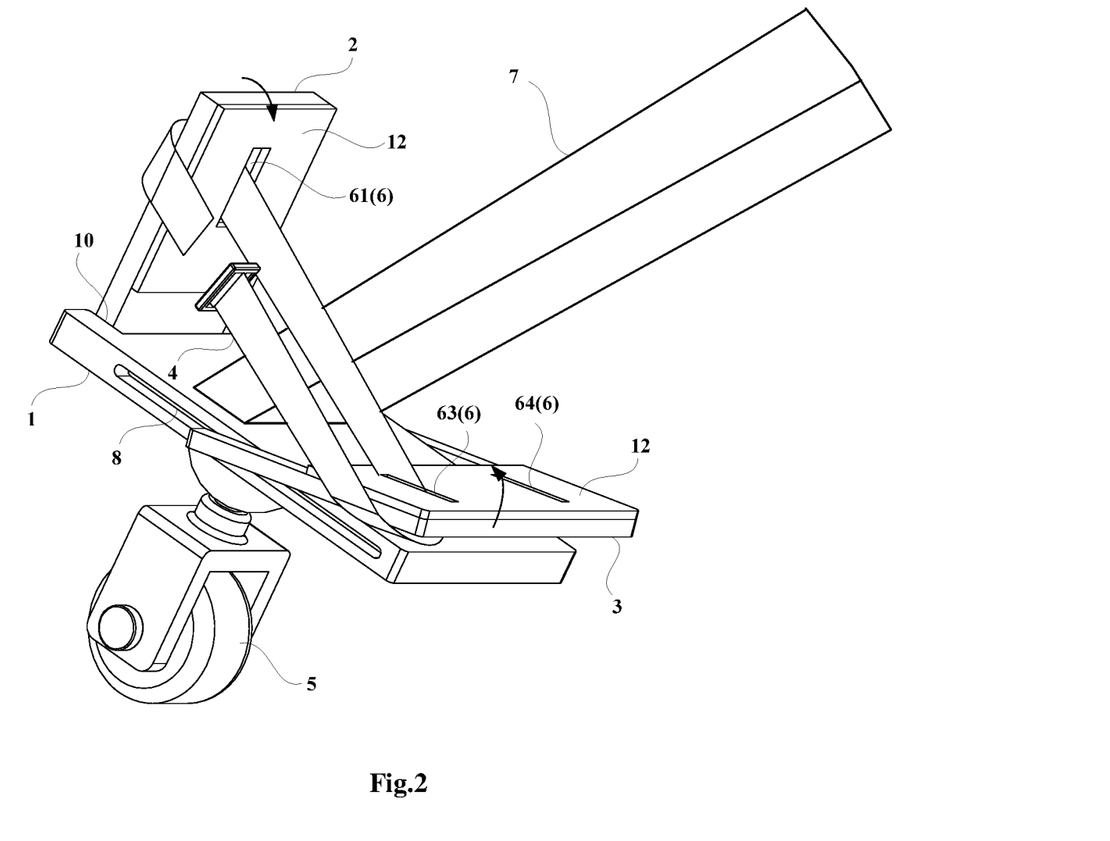
FIG. 2 illustrates a schematic perspective view of the transportation support assembly as illustrated in FIG. 1 in case that it supports an object to be supported.

FIG. 1 illustrates a schematic perspective view of a transportation support assembly according to an embodiment of the disclosure; and FIG. 2 illustrates a schematic perspective view of the transportation support assembly as illustrated in FIG. 1 in case that it supports an object to be supported. As illustrated in FIG. 1 and FIG. 2, the transportation support assembly 100 according to an embodiment of the disclosure comprises a supporting plate 1; a first baffle plate 2; a second baffle plate 3; and at least one bundling strap 4 and a rolling wheel 5. Each of the first baffle plate 2 and the second baffle plate 3 is hinged with the supporting plate 1 respectively and is provided thereon respectively with at least one through-hole 6, i.e., a through-hole 61 of the first baffle plate 2 and through-holes 63, 64 of the second baffle plate 3, as illustrated. The at least one bundling strap 4 passes through the through-holes 6 of both the first and the second baffle plates 2, 3, e.g., passes through the through-hole 61 and the through-hole 63, as illustrated in FIG. 1; and the rolling wheel 5 is assembled at a bottom portion of the supporting plate 1. In addition, as illustrated in FIG. 2, when the bundling strap 4 is tightened and tied up such that the first baffle plate 2, the second baffle plate 3 and the bundling strap cooperate with one another to clamp an object 7 to be supported, the object 7 to be supported in the embodiment may alternatively be a supporting leg mounted on the apparatus to be handled and/or carried.

Figure 3:
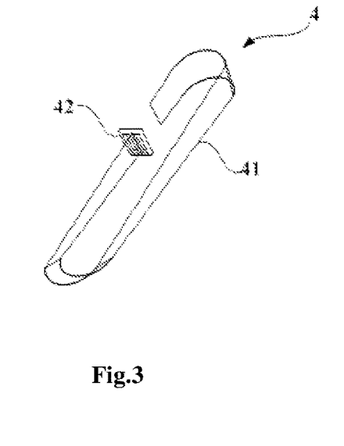
FIG. 3 illustrates a schematic view of a bundling strap according to an embodiment of the disclosure.

As illustrated in FIG. 3, each bundling strap 4 comprises a strap 41 and a buckle 42, one end of the strap 41 being secured to the buckle 42, while the other one end of the strap 41 being configured to pass through the buckle 42 and in turn to be secured removably thereto such that the bundling strap forms a closed flexible ring itself and being operable to adjust a level of tension of the bundling strap 4 which functions as the closed flexible ring. Specific type of the bundling strap 4 in the embodiment is not restricted, for example, a common strap may be used to bind up.

Referring to FIG. 1, a first articulation axis which is provided at a position where the first baffle plate 2 and the supporting plate 1 are hinged with each other is parallel to a second articulation axis at a position where the second baffle plate 3 and the supporting plate 1 are hinged with each other. As such, when the bundling strap 4 is tightened and tied up, the first baffle plate 2 and the second baffle plate 3 may for example pivot respectively relative to the supporting plate 1 such that both the first baffle plate 2 and the second baffle plate 3 press closely against the supporting legs 7 of the apparatus, resulting in a relative large friction force and in turn obtaining a relatively robust and secured fixation of the supporting legs 7. It is worthwhile to mention that, in case that a certain first included angle is formed between two opposite surfaces of the supporting legs 7 of the apparatus which opposite surfaces are clamped by the first baffle plate 2 and the second baffle plate 3 respectively, the first articulation axis between the first baffle plate 2 and the supporting plate 1 and the second articulation axis between the second baffle plate 3 and the supporting plate 1 also form collectively a corresponding second included angle therebetween which is for example equal to the first included angle, such that the two clamped opposite surfaces of the supporting legs 7 are pressed closely against by the first baffle plate 2 and the second baffle plate 3 respectively.

As illustrated in FIG. 1, the first baffle plate 2 is provided with a first through-hole 61, while the second baffle plate 3 is provided with a third through-hole 63 and a fourth through-hole 64 arranged side by side, and the at least one bundling strap comprises two bundling straps 4, only one bundling strap being illustrated exemplarily while the other one being omitted for brevity and clearness. The two bundling straps 4 pass through the first through-hole 61 of the first baffle plate 2 collectively and then pass through the third through-hole 63 and the fourth through-hole 64 of the second baffle plate 3 respectively. The supporting legs 7 are limited in position by the two bundling straps 4, e.g., from other two directions, so as to prevent the supporting legs 7 from sliding between the first baffle plate 2 and the second baffle plate 3 and in turn to fix the supporting legs in a more reliable and secured manner. Furthermore, when the first baffle plate 2 and the second baffle plate 3 both press closely against the supporting legs 7 of the apparatus, especially when the first baffle plate 2 and the second baffle plate 3 respectively press closely against the two clamped opposite surfaces of the supporting legs 7 of the apparatus, the two bundling straps 4, which pass through the first through-hole 61 of the first baffle plate 2 collectively and then pass through the third through-hole 63 and the fourth through-hole 64 of the second baffle plate 3 respectively, are in tension so as to form a steady triangular structure collectively with the second baffle plate 3, such that the object 7 to be supported is supported fixedly while the bundling straps are in tension to facilitate generation of a steady integral structure of the transportation support assembly.

Figure 2A:
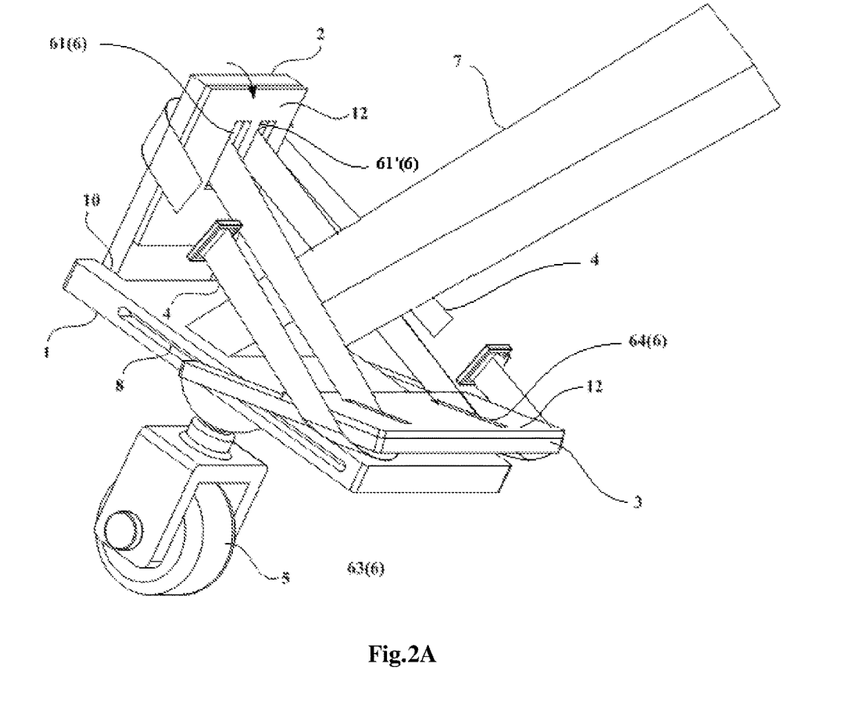
FIG. 2A illustrates a schematic perspective view of a transportation support assembly according to another embodiment of the disclosure, which shows that the first baffle plate is provided with an additional second through-hole, and there is an additional second bundling strap passing through the second through-hole of the first baffle plate and the fourth through-hole of the second baffle plate, in case that it supports an object to be supported.

In another embodiment of the disclosure, as illustrated in FIG. 2A, the first baffle plate 2 is provided with a first through-hole 61 and an additional second through-hole 61', while the second baffle plate 3 is provided with a third through-hole 63 and a fourth through-hole 64, and the at least one bundling strap 4 comprises two bundling straps, one of the two bundling straps 4 passing through the first through-hole 61 of the first baffle plate 2 and the third through-hole 63 of the second baffle plate 3 while the other one of the two bundling straps passing through the second through-hole 61' of the first baffle plate 2 and the fourth through-hole 64 of the second baffle plate 3, without any intersection being provided between the two bundling straps 4. In other words, the two bundling straps pass through the two through-holes of the first baffle plate and then the two through-holes of the second baffle plate, respectively, without any intersection. Similarly, the two bundling straps may limit the supporting legs in position from other two directions, so as to prevent the supporting legs from sliding between the first baffle plate and the second baffle plate, facilitating a fixation of the supporting legs in a more reliable and secured manner.

Figure 4:
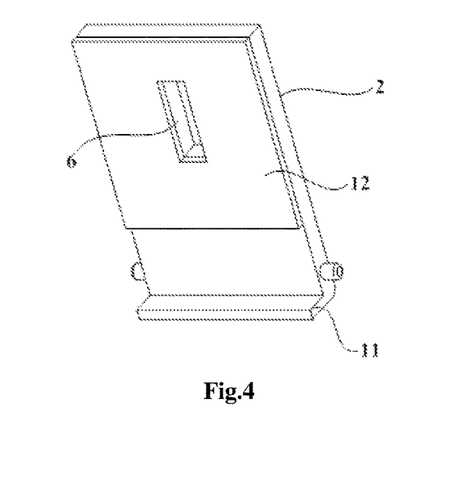
FIG. 4 illustrates a schematic view of a first baffle plate according to an embodiment of the disclosure.
Figure 5:
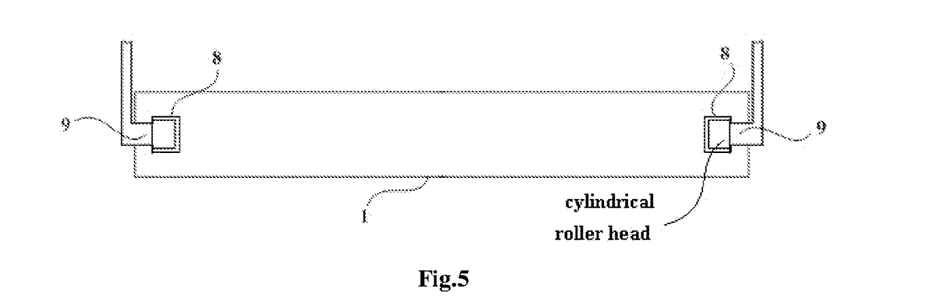
FIG. 5 illustrates a schematic sectional view of an assembly of a second baffle plate and a supporting plate according to an embodiment of the disclosure, which is sectioned along line A-A as illustrated in FIG. 1.

FIG. 5 illustrates a schematic sectional view of an assembly of a second baffle plate and a supporting plate according to an embodiment of the disclosure, which is sectioned along line A-A as illustrated in FIG. 1. Referring to FIG. 1 and FIG. 5, the supporting plate 1 comprises two sliding chutes 8 provided on two opposite side end surfaces thereof in one-to-one correspondence, respectively, in a lengthwise direction of the supporting plate at an end thereof abutting the second baffle plate 3. And the second baffle plate 3 further comprises a pair of rollers 9. Each roller 9 is provided with a cylindrical roller head at an end thereof which snaps fit into a respective one of the two sliding chutes 8 in one-to-one correspondence respectively, and the cylindrical roller head is formed in a form of a wheel as illustrated in FIG. 5, such that each of the pair of rollers 9 may be assembled slidably within respective one of the two sliding chutes 8 respectively and pivotable relative to the two sliding chutes 8 respectively in response to the respective cylindrical roller head functioning as a respective pivot therefor, within respective sliding chute 8. With such a design, since the supporting legs of different apparatuses, i.e., the objects to be supported, differ from one another in sizes and shapes thereof, then, a position at which the second baffle plate 3 and the supporting plate 1 is hinged may be adjusted by adjusting specific positions in the sliding chutes 8 to which the rollers slide, such that the transport device may for example be applicable to apparatus products of different specifications. In a further embodiment, the hinge between the second baffle plate and the supporting plate 1 is for example implemented by an assembly engagement between a chute penetrating the supporting plate 1 and a roller provided slidably and rotatably in the chute. FIG. 4 illustrates a schematic view of a first baffle plate according to an embodiment of the disclosure. Referring to FIG. 1 and FIG. 4, in the embodiment as illustrated, the supporting plate 1 is provided with a mounting recess 10 on a front end surface thereof perpendicular to the two side end surfaces as illustrated, in a lengthwise direction of the supporting plate 1 at an end thereof abutting the first baffle plate 2, in which mounting recess the first baffle plate 2 is mounted. The first baffle 2 is profiled to be substantially in a form of L shape as observed from a side thereof, and is provided with a limiting portion 11 which is pivotable to a lower portion of a bottom wall of the supporting plate 1. When the transportation support assembly 100 is folded for storage, both the first baffle plate 2 and the second baffle plate 3 pivot to be overlaid on the supporting plate 1; and when the transportation support assembly 100 is in use, the first baffle plate 2 and the second baffle plate 3 pivot to erect relative to the supporting plate 1, since once the first baffle plate 2 rotates a certain angle facing away from a top surface of the supporting plate 1, the limiting portion 11 may subsequently be restricted in place against the bottom wall of the supporting plate 1, therefore, the first baffle plate 2 may not rotate to an excessively large angle, not to mention to rotate below the supporting plate 1. The transportation support assembly in the embodiment not only facilitates operation but also facilitates folding and storage.

In the embodiment, by way of example, each of the first baffle plate 2 and the second baffle plate 3 may further be provided with a cushion mat 12 on a side thereof facing towards the supporting legs 7 of the apparatus, respectively. As such, once the supporting legs 7 are clamped by the first baffle plate 2 and the second baffle plate 3, scratches on the supporting legs 7 may be diminished correspondingly, such that the supporting legs are protected; furthermore, friction forces between the supporting legs 7 and the first baffle plate 2 or the second baffle plate 3 may be increased, facilitating a fixation of the supporting legs in a more reliable and secured manner. And the cushion mat 12 is for example a rubber pad/gasket, cushion foams, or the like.

In the embodiment, the rolling wheel 5 is for example an omni-directional rolling wheel, facilitating a more flexible, convenient and effortless movement of the transportation support assembly.

Figure 6:
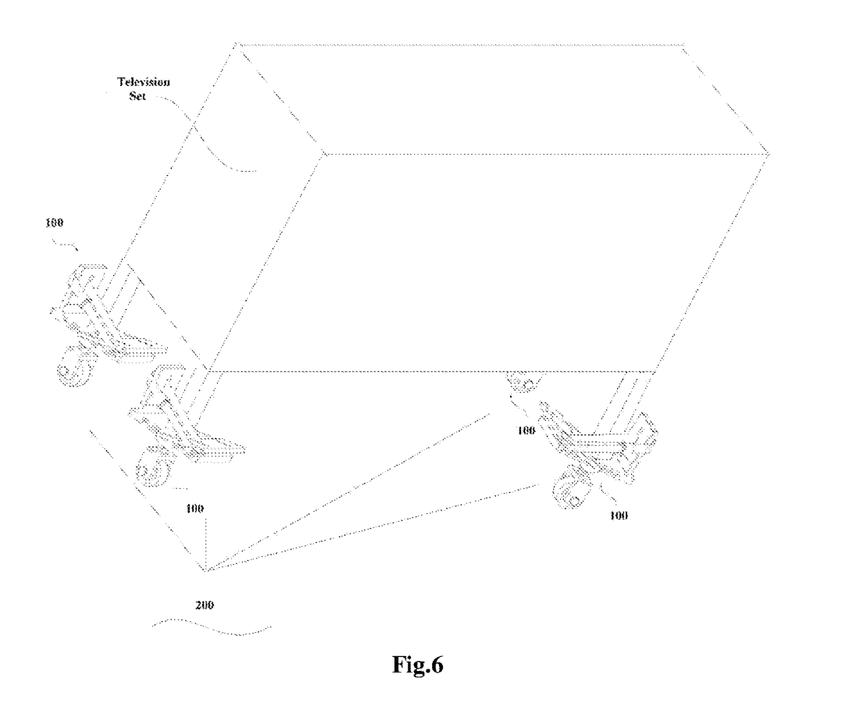
FIG. 6 illustrates a schematic perspective view of a transport device for transporting an apparatus provided with a plurality of objects to be supported, according to an embodiment of the disclosure, the transport device comprising a plurality of the transportation support assemblies as above, and the apparatus is a television set, and the objects to be supported comprising supporting legs supporting the television set.

In an embodiment of the disclosure, as illustrated in FIG. 6, there is further provided a transport device 200 for transporting an apparatus provided with a plurality of objects to be supported, comprising at least one transportation support assembly 100, the objects to be supported being fixed onto the transportation support assembly respectively such that the apparatus is movable wholly by the transport device 200. Specific apparatus which is handled or carried by the transport device may not be restricted, e.g., an electrical equipment or a mechanical equipment (such as a television set, a washing machine, and the like) having supporting legs. Besides, specific number of the transportation support assembly 100 may be determined depending on practical number of the supporting legs of the apparatus, rather than being restricted in advance. By way of example, one television set may have four supporting legs, and correspondingly, there are four sets of transportation support assemblies 100. Moreover, specific cross-sectional shape of the supporting legs of the apparatus may not be restricted, e.g., a practical cross-sectional shape thereof may be any one of a rectangular shape, an elliptical shape, a parallelogrammatic shape, and the like.

When the transport device 200 of the embodiment is used for handling and/or carrying the apparatus, each supporting leg 7 of the apparatus is firstly placed onto the supporting plate 1 of the transportation support assembly 100, and then the bundling strap 4 is tightened and tied up such that the first baffle plate 2, the second baffle plate 3 and the bundling strap 4 cooperate with one another to clamp the object 7 to be supported; when each of the supporting legs 7 is fixed onto a corresponding transportation support assembly 100, then the apparatus may be moved for handling and/or carrying and transportation. The transport device may only be required to be lifted up and carried along gently and manually when in use such that the supporting legs 7 of the apparatus may be laid on the supporting plate 1, without spending substantial human labor. As compared with the prior art, not only the human labor required for handing and/or carrying the apparatus may be diminished, but also any risk in handing and/or carrying the apparatus may be reduced, by use of the transport device. Furthermore, various transportation support assemblies 100 are relatively small and delicate in structure thereof, and are provided independently from one another, resulting in a saved space occupation when folded for storage.

In an embodiment, by way of example, a plurality of linkage frames are provided on the supporting plates 1 of each two adjacent transportation support assemblies 100, so as to combine a plurality of the transportation support assemblies into a whole, facilitating driving the whole transport device in motion. In addition, for example, various linkage frames are provided to be expandable such that positions of corresponding transportation support assemblies 100 may be adjusted depending on size of the apparatus to be moved and/or pitch of the objects to be supported (e.g., the supporting legs of the apparatus), so as to move apparatus of different sizes and shapes.

In another embodiment of the disclosure, there is also provided another transportation support assembly and a transport device for at least one transportation support assembly. For a purpose of conciseness in illustration, any technical features which may be used for similar applications as in above embodiments may be incorporated herein, without repeating identical depictions as above any more.

The directional terminologies mentioned in the embodiments, such as "above", "below", "front", "back", "left", "right", and the like, only refer to directions by referring to the drawings, rather than apply any limitation on scope of protection of the disclosure. Furthermore, above embodiments may be implemented based on a consideration of design and reliability, and cooperate with one another or with other embodiment(s), in application; in other words, technical features in different embodiments may be combined freely so as to construct more embodiments.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A transportation support assembly, comprising:
   a supporting plate;
   a first baffle plate;
   a second baffle plate; and
   at least one bundling strap,
   wherein each of the first baffle plate and the second baffle plate is provided thereon respectively with at least one through-hole through which the at least one bundling strap passes, and in response to the first baffle plate and the second baffle plate being freely pivotably hinged to the supporting plate such that in an operation condition, the first baffle plate, the second baffle plate, and the bundling strap cooperate with one another to clamp an object to be supported; and
   wherein the supporting plate comprises two sliding chutes provided on two opposite side end surfaces thereof in one-to-one correspondence, respectively, and the second baffle plate further comprises a pair of rollers which snap fit into the two sliding chutes in one-to-one correspondence respectively, the pair of rollers being assembled slidably within and pivotable relative to the two sliding chutes respectively.

2. The transportation support assembly according to claim 1, wherein an articulation axis which is provided at a position where the first baffle plate and the supporting plate are hinged with each other is parallel to an articulation axis at a position where the second baffle plate and the supporting plate are hinged with each other.

3. The transportation support assembly according to claim 1, wherein the first baffle plate is provided with a first through-hole, while the second baffle plate is provided with a third through-hole and a fourth through-hole, and the at least one bundling strap comprises two bundling straps which pass through the first through-hole of the first baffle plate collectively and then pass through the third through-hole and the fourth through-hole of the second baffle plate respectively.

4. The transportation support assembly according to claim 1, wherein the first baffle plate is provided with a first through-hole and a second through-hole, while the second baffle plate is provided with a third through-hole and a fourth through-hole, and the at least one bundling strap comprises first and second bundling straps, the first bundling strap passing through the first through-hole of the first baffle plate and the third through-hole of the second baffle plate and the second bundling strap passing through the second through-hole of the first baffle plate and the fourth through-hole of the second baffle plate, without any intersection being provided between the first and second bundling straps.

5. The transportation support assembly according to claim 1, wherein the supporting plate further comprises a mounting recess on a front end surface thereof perpendicular to the two side end surfaces, in which mounting recess the first baffle plate is mounted in a hinged manner.

6. The transportation support assembly according to claim 5, wherein the first baffle is profiled to be substantially in a form of L shape, and is provided with a limiting portion which is pivotable to a lower portion of a bottom wall of the supporting plate.

7. The transportation support assembly according to claim 1, wherein at least one of the first baffle plate and the second baffle plate further comprises a cushion mat on a side thereof against which side the object to be supported is clamped.

8. The transportation support assembly according to claim 1, wherein each bundling strap comprises a buckle and a strap, a first end of the strap being secured to the buckle, while a second end of the strap being configured to pass through the buckle and to adjust a level of tension of the bundling strap.

9. The transportation support assembly according to claim 1, further comprising at least one omni-directional rolling wheel which is assembled at a bottom portion of the supporting plate.

10. A transport device for transporting an apparatus provided with a plurality of objects to be supported, comprising a plurality of the transportation support assemblies according to claim 1, wherein the objects to be supported are fixed onto the transportation support assembly respectively such that the apparatus is movable wholly by the transport device.

11. The transport device according to claim 10, wherein the apparatus comprises a television set, and the objects to be supported comprise supporting legs supporting the television set.

* * * * *